United States Patent
Ivchenko et al.

[15] 3,669,317
[45] June 13, 1972

[54] DEVICE FOR UNLOADING BULK MATERIAL FROM RESERVOIRS

[72] Inventors: Georgy Semenovich Ivchenko, Donetskoi oblasti, pereulok Semafory, 5"b"; Anatoly Mikhailovich Berestovoi, Donetskoi oblasti, Prospekt Metallurgov, 35, kv. 42; Vladislav Fedorovich Khanchas, Donetskoi oblasti, 24 kvartal, 19, kv. 4; Nina Ivanovna Orlitskaya, Donetskoi oblasti, ulitsa Sechenova, 57, kv. 60; Anatoly Pavlovich Nikodimov, Donetskoi oblasti, ulitsa Artema, 46, kv. 33, all of Zhdanov, U.S.S.R.

[22] Filed: May 7, 1969

[21] Appl. No.: 822,559

[52] U.S. Cl. .................................. 222/195, 222/202
[51] Int. Cl. ........................................... B65g 3/12
[58] Field of Search ............. 222/1, 198, 195, 202, 203

[56] References Cited

UNITED STATES PATENTS

| | | | |
|---|---|---|---|
| 2,170,258 | 8/1939 | Borch | 222/202 |
| 2,732,099 | 1/1956 | Davis | 222/203 X |
| 2,756,906 | 7/1956 | Carter | 222/203 |
| 2,913,147 | 11/1959 | Johnson et al. | 222/203 X |
| 3,099,494 | 7/1963 | Heinze | 222/202 X |
| 3,144,176 | 8/1964 | Gronkvist | 222/203 X |
| 3,253,750 | 5/1966 | Paton | 222/203 X |

FOREIGN PATENTS OR APPLICATIONS 237,509  4/1964  Austria ............................ 222/203

Primary Examiner—Robert B. Reeves
Assistant Examiner—Norman L. Stack, Jr.
Attorney—Waters, Roditi, Schwartz & Nissen

[57] ABSTRACT

A device is provided for unloading bulk materials from reservoirs by the use of the energy of a compressed gaseous medium. The device comprises elastic sloped walls disposed in the reservoir at the bottom thereof, the walls having a plurality of spaced passages therein which are connected to a system for the intermittent supply of a gaseous medium into the passages for imparting vibratory motion to the sloped walls, i.e., movement towards and away from the walls of the reservoir. Between the passages in the elastic walls there are provided porous sections which permit the flow of compressed gaseous medium therethrough and into the reservoir to impart fluidity to the bulk material therein.

3 Claims, 2 Drawing Figures

A DEVICE FOR UNLOADING BULK MATERIAL FROM RESERVOIRS

The present invention relates to reservoirs for the storage, transportation and unloading of bulk materials and more specifically to methods and apparatus for unloading bulk materials from reservoirs fitted in the bottom thereof with elastic sloped walls.

Most effectively the present invention can be utilized in cases in which when the bulk materials become compacted. Such material include soda ash, flour, superphosphate, etc.

Known in the art are methods of unloading bulk materials utilizing elastic sloped walls in the bottom of the reservoir.

Such elastic slope walls are made airtight and are fastened by the upper edges to the inner wall of the reservoir, while their lower edges are fastened to the sides of the air chute or the lower walls of said reservoir.

The points of fastening are also made airtight.

In the course of unloading, air is delivered separately to the air chute and under the elastic sloped walls.

Under the pressure of the air, the elastic sloped walls bulge out into the reservoir and throw the bulk material onto the air chute, which is inclined at this moment at an angle towards the discharge door, and remains so until unloading is completed (see, for example, the Japanese Pat. No. 8376, Cl. 83D 41, 1965). A disadvantage of this device is that the elastic sloped walls fail to break up the clods of the caked material which remain in the reservoir; additionally when the space between the elastic wall and the reservoir wall is depressurized, the bulk material is not unloaded.

The main object of the present invention resides in providing apparatus for unloading bulk material from reservoirs, with elastic sloped walls in the bottom thereof, which will allow unloading bulk materials susceptible to caking, by the use of elastic sloped walls which can be moved in such a manner as to insure efficient unloading.

According to the invention, this object is carried into effect by making the elastic sloped walls vibrate i.e. move back and forth under the action of a gaseous medium.

The device according to the invention has elastic sloped walls with passages, communicating with a system of intermittent gas supply. As a result, the passages bulge out periodically; this reduces the size of the sloped walls, they straighten out and come away from the walls of the reservoir. This contributes to efficient disintegration of the compacted bulk material.

In the preferable embodiment of the device according to the invention, the sloped walls have porous sections between the passages; compressed gas medium is fed to these pores to impart fluidity to the compacted bulk material.

A substantial advantage of the present invention consists in that is allows the compacted bulk materials to be completely and wholly unloaded from the reservoirs.

Given below is a detailed description of a preferable embodiment of the invention, with reference to the accompanying drawings in which.

Figure 1:
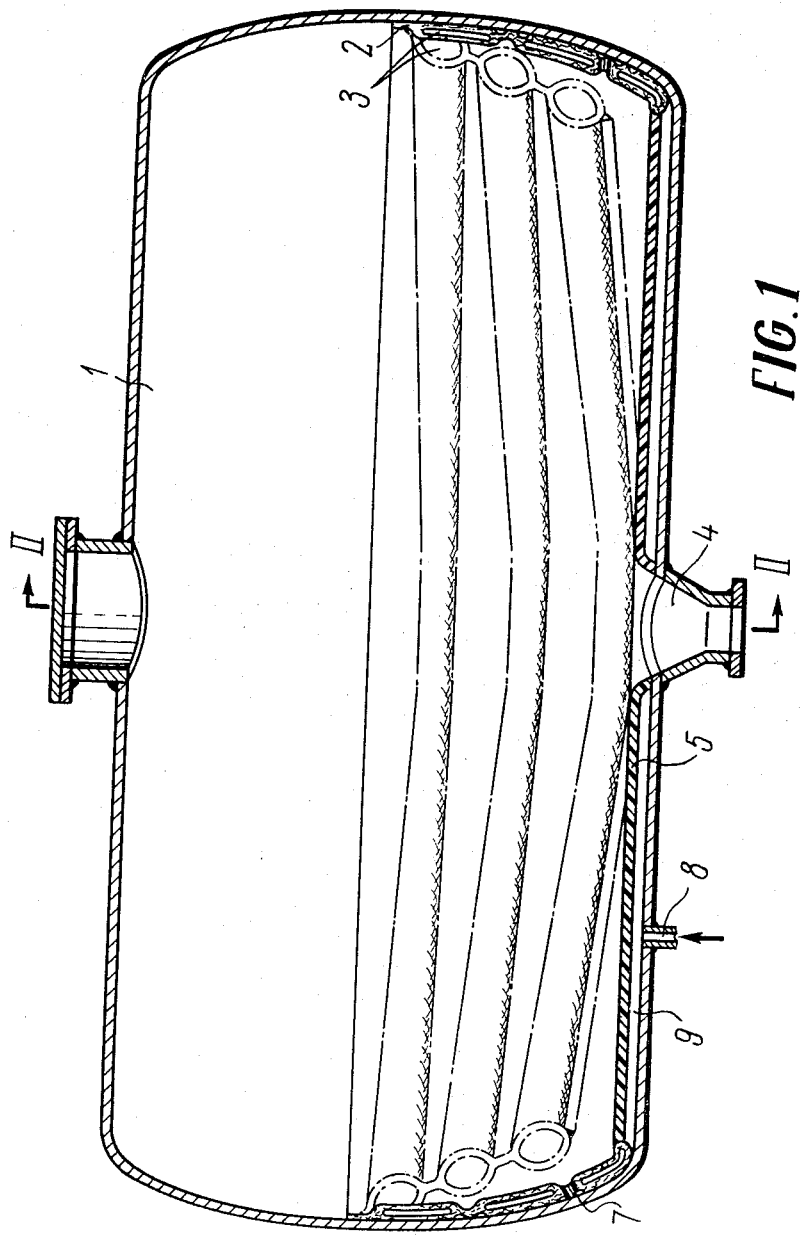
FIG. 1 is a longitudinal section of a reservoir with a device for unloading compacted bulk materials from reservoirs fitted with elastic sloped walls in the bottom, according to the invention.
Figure 2:
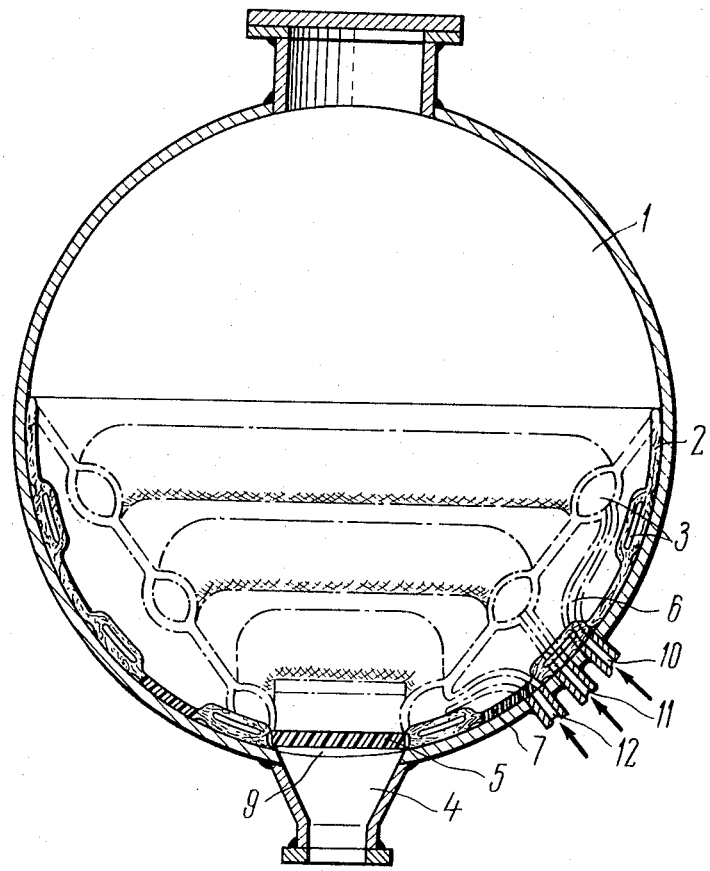
FIG. 2 is a section taken along line I—I of FIG. 1.

Accommodated in a reservoir 1 (FIGS. 1, 2) is a device for unloading bulk materials, comprising elastic sloped walls 2 made of rubberized capron.

Inside the elastic sloped walls 2 there are annular passages 3 in the form of hollows in the elastic sloped walls, located along the inner perimeter of the reservoir 1.

Located along the bottom of the reservoir 1, on both sides of a discharge outlet 4 are porous plates 5, one end of each plate being connected to the discharge outlet 4 while the other end and side surfaces are connected to the elastic sloped walls 2.

The diameter of the annular passages 3 in the elastic sloped walls 2 becomes smaller towards the discharge outlet 4 and reaches a minimum value near this outlet, this being done for inclining the porous plates 5 in the course of unloading the bulk material.

The upper edges of the elastic sloped walls 2 are fastened to the walls of the reservoir 1 while their lower edges are fastened to the porous plates 5 and the discharge outlet 4.

The passages 3 are communicated by flexible hoses 6 with a system of intermittent compressed air supply (the system is not shown in the drawings).

The sections 7 of the elastic sloped walls 2 between the passages 3 are made porous, that is air permeable.

Under the elastic sloped walls 2 in the bottom of the reservoir 1 there is a pipe union 8 by means of which the space 9 formed by the inner walls of the lower part of the reservoir 1 and the elastic sloped walls 2 with the porous plates 5, is put in communication with a compressed-air constant-supply system (not shown in the drawings).

When the bulk materials are being unloaded from the reservoir 1, the air is delivered from the air constant-supply system through the pipe union 8 into the space 9 and further, through the porous plate 5 and the porous sections 7 of the elastic sloped walls 2 into the reservoir 1.

Passing through the porous plate 5 and porous sections 7 of the elastic sloped walls 2, the air penetrates into the bulk material, thus adding to its fluidity.

As the air pressure in the reservoir is raised to 2 atm gauge (the most effective pressure of air in accordance with the experimental data obtained while unloading the railway tank cars carrying bulk materials) the discharge outlet 4 opens and the bulk material is partly discharged from the reservoir 1, vacating part of the inside space in the reservoir 1 near the discharge outlet 4.

The air pressure in the reservoir 1 begins to drop, due to the fact, that part of the bulk material has been unloaded from the discharge outlet.

At this point, air under a pressure higher, than that in the reservoir 1, is delivered into the passages 3 of the elastic sloped walls 2 through the pipe unions 10, 11 and 12 and flexible hoses 6 from the intermittent air supply system.

The passages 3 expand and stretch the elastic sloped walls 2, which straighten out, move away from the walls of the reservoir 1 and throw the compacted bulk material towards the discharge outlet 4 and onto the porous plates 5.

The bulk material is thus unloaded from the reservoir.

Then the air pressure is reduced in the passages 3 and the elastic sloped walls 2 are pressed by the weight of the material against the walls of the reservoir 1.

After an interval of 0.5 to 2 minutes the air pressure is again raised in the passages 3 and then is reduced after an identical period of time.

This process is repeated a few times, the time of unloading such a material, as soda ash from railway tank cars, not exceeding several tens of minutes.

At the end of unloading, the air is fed under a constant pressure into the passages 3 of the elastic sloped walls 2 which, straightening out, incline the porous plates 5 thus completely emptying the reservoir 1. As evident from the operation, the plates 5 must be non-rigid in order to permit the elastic walls to be displaced when the passages 3 are inflated and the plates assume the tilted positions as shown in chain-dotted lines in FIG. 1.

What we claim is:

1. A device for unloading bulk materials from reservoirs by the use of the energy of a compressed gaseous medium, said device comprising elastic sloped walls disposed in a reservoir at the bottom thereof, said walls having a plurality of spaced annular passages therein, porous sections in said elastic sloped walls between the said annular passages, means for supplying a compressed gaseous medium through said porous sections and into the reservoir to impart fluidity to the bulk material therein; and means for the intermittent supply of a gaseous medium into said passages for successively inflating and deflating said passages for imparting vibratory motion to said sloped walls.

2. A device according to claim 1 wherein said reservoir is provided with an outlet at the lower end thereof, said device further comprising a pair of porous plates at the lower end of the reservoir and attached at and extending in opposite directions from said outlet, said porous plates having ends remote from said outlets with side edges attached to said elastic walls at the lower end thereof, said porous plates being non-rigid and being tilted by said elastic walls when the passages therein are inflated.

3. A device according to claim 2 wherein the diameter of said passages diminishes towards said outlet.

* * * * *